United States Patent [19]
Carbine et al.

[11] 3,960,264
[45] June 1, 1976

[54] ITEM TRANSPORT APPARATUS

[75] Inventors: Joseph C. Carbine, Wyncote;
Robert S. Bradshaw, Broomall, both of Pa.

[73] Assignee: Burroughs Corporation, Detroit, Mich.

[22] Filed: Jan. 28, 1975

[21] Appl. No.: 544,926

[52] U.S. Cl. ............... 198/179; 214/1 BA; 271/204; 294/104
[51] Int. Cl.² ........................... B65G 17/12
[58] Field of Search ........ 198/179, 180; 214/1 BA; 271/204, 277; 294/101, 104; 104/180, 202, 222, 226

[56] References Cited
UNITED STATES PATENTS

| | | | |
|---|---|---|---|
| 1,167,730 | 1/1916 | Wagner et al. | 198/180 X |
| 1,423,952 | 7/1922 | McCracken | 198/180 |
| 1,581,526 | 4/1926 | Willsea | 198/180 X |
| 2,446,610 | 8/1948 | Renfroe | 294/104 |
| 2,654,630 | 10/1953 | Renfroe | 294/104 |
| 2,852,257 | 9/1958 | Sperry | 198/180 |
| 3,055,480 | 9/1962 | Hyman | 198/180 X |
| 3,204,748 | 9/1965 | Soules | 198/179 X |
| 3,659,890 | 5/1972 | Renfroe | 294/101 X |
| 3,843,186 | 10/1974 | Van de Wetering | 294/101 |
| 3,857,600 | 12/1974 | Hasegawa | 294/101 X |

*Primary Examiner*—Evon C. Blunk
*Assistant Examiner*—Richard K. Thomson
*Attorney, Agent, or Firm*—Carl Fissell, Jr.; Edward J. Feeney, Jr.; Kevin R. Peterson

[57] ABSTRACT

An item carrier for an item transport system wherein the carrier member is provided with means automatically adjustably movable as a result of the pendulum effect or tilt of the item effective to prevent accidental dislodgement or disengagement of the item from the carrier while simultaneously causing the tilt or pendulum movement thereof to continuously move the item into a tighter engaging position in the carrier with each tilt or swing.

7 Claims, 11 Drawing Figures

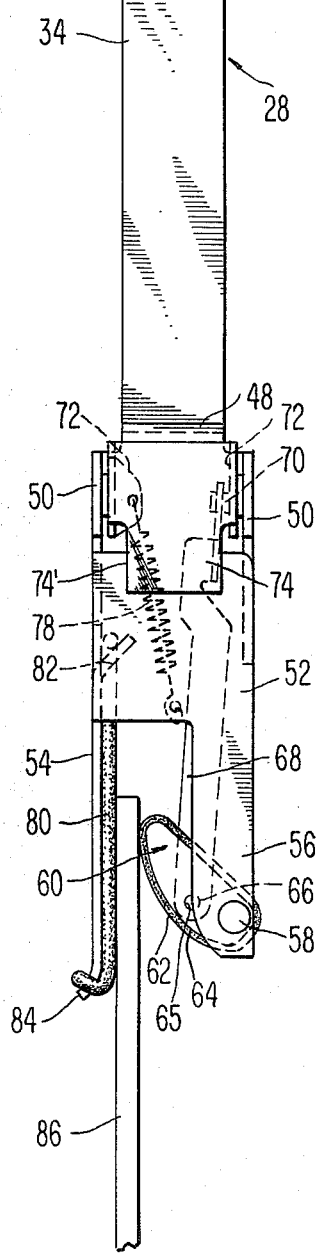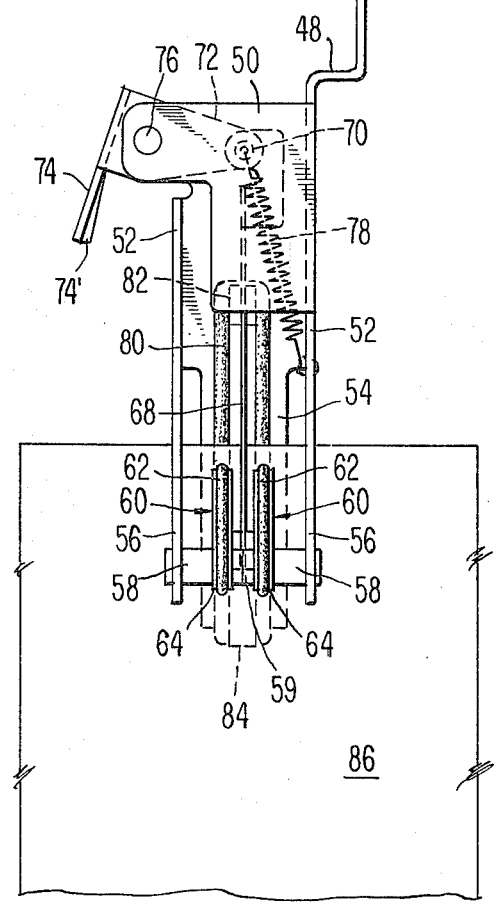

ITEM TRANSPORT APPARATUS

BACKGROUND OF THE INVENTION

Traditional means for transporting objects from one location to another includes conveyor belts, hook-type hangers movable along a prescribed and predetermined pathway, transport chutes, rollerways, pneumatic tubes, mechanical conveyor links, etc. Each of these types of apparatus is useful for a relatively limited number of types and kinds of items, such that no one system can be adapted to or accommodate all types of movable items. This is so simply because the variations in size, weight and general overall configuration of items precludes efficient utilization of any single transport means.

In many, but not all transport systems, a certain degree or amount of item swing or tilt can be and usually is tolerated since such movement causes no problems with the item and the elimination of item movement is more costly than the benefit to be derived from the alteration of the structure.

Where, as with the transport of relatively flat, semi-bulky items including relatively thick material sheets, flat mail packets and semi-rigid yet slightly flexible rectangular material, such items are or may be gripped or seized at one location, not necessarily centered on the item, there is a tendency of the item to rock, swing or tilt pendulum-like about such attachment point. If the item being transported is secured by a hook or other penetrating element of the hanger, such swinging or rocking motion is of relatively little consequence. However, where the item is gripped and supported by confronting elements between which the item is secured, as by pressure, any rocking, tilting, swinging or pendulum movement can and often does cause the item ultimately to slip from the grasp of the gripping device and be dropped or left behind in the path of movement of oncoming items. This causes item jams and clogs the item pathway, destroying the item count and generally creating multiplicitous problems along the path.

The present invention solves these problems in a new, novel and heretofore unknown manner by utilizing an item transport carrier or hanger which takes full advantage of any swing, tilt, or rocking movement and is effective to cause the item to become more fully engaged with the item hanger, thus positively assuring precise mechanical transport and eliminating the possibility of item jams or clogs due to accidental dislodgement of the items from the item hanger.

The present invention is related to application Ser. No. 401,954, filed Sept. 28, 1973, in the names of Robert S. Bradshaw et al, entitled "System For Processing Articles Including Flat Mail Pieces" now U.S. Pat. No. 3,884,370, and is assigned to the same assignee as the present invention.

Summary of the Invention

The present invention provides an item transport hanger including an irregularly shaped elongate member one end of which is engagable with the item transport apparatus while the opposite end thereof is engagable with an item to be transported. The item engaging end of the hanger is configured to provide two orthogonally disposed confronting support means. The lower support means carries a pair of item engaging elliptically shaped wedging members pivotally mounted for rocking movement about the supports as a center and projecting outwardly away therefrom for pressure engagement with an item disposable between said wedging members and a backup anvil member integral with this end of the hanger. The upper support means pivotally mounts a release member, the latter rockably engages the wedging members in spring biased contact effective upon movement of the release member to rock the wedging members into and out of engaging contact with an item to be transported thereby. The release member includes an integral portion engagable with means in the transport system for effecting automatic movement of the wedging members, in accordance with the prearranged engagement of an item for transport to a prescribed destination in the system.

The invention, both as to its organization and method of operation, together with further objects and advantages thereof, will be best understood by reference to the detailed description taken in conjunction with the accompanying drawings.

BRIEF DESCRIPTION OF THE DRAWINGS

FIG. 3 is a front view of a carrier hanger incorporating the present invention;

FIG. 4 is a side view of the carrier hanger of FIG. 3;

DESCRIPTION OF THE PREFERRED EMBODIMENT

The present invention is illustrated and described as it might be utilized in a flat-mail sorting system and as described and illustrated in formerly copending U.S. patent application Ser. No. 401,954, entitled "System For Sorting And Processing Articles Including Flat Mail Pieces", now U.S. Pat. No. 3,884,370, assigned to the same assignee as the present invention. However, it is to be understood that the present invention has utility in other and different apparatus from that of mail sorting. For example, this invention has application to the handling of any relatively flat material, such for example, as sheet metal, glass, cardboard, plastic, etc., which is to be transported from one location to another for subsequent stacking or further processing or handling, in accordance with a desired process or fabrication technique.

Figure 1:
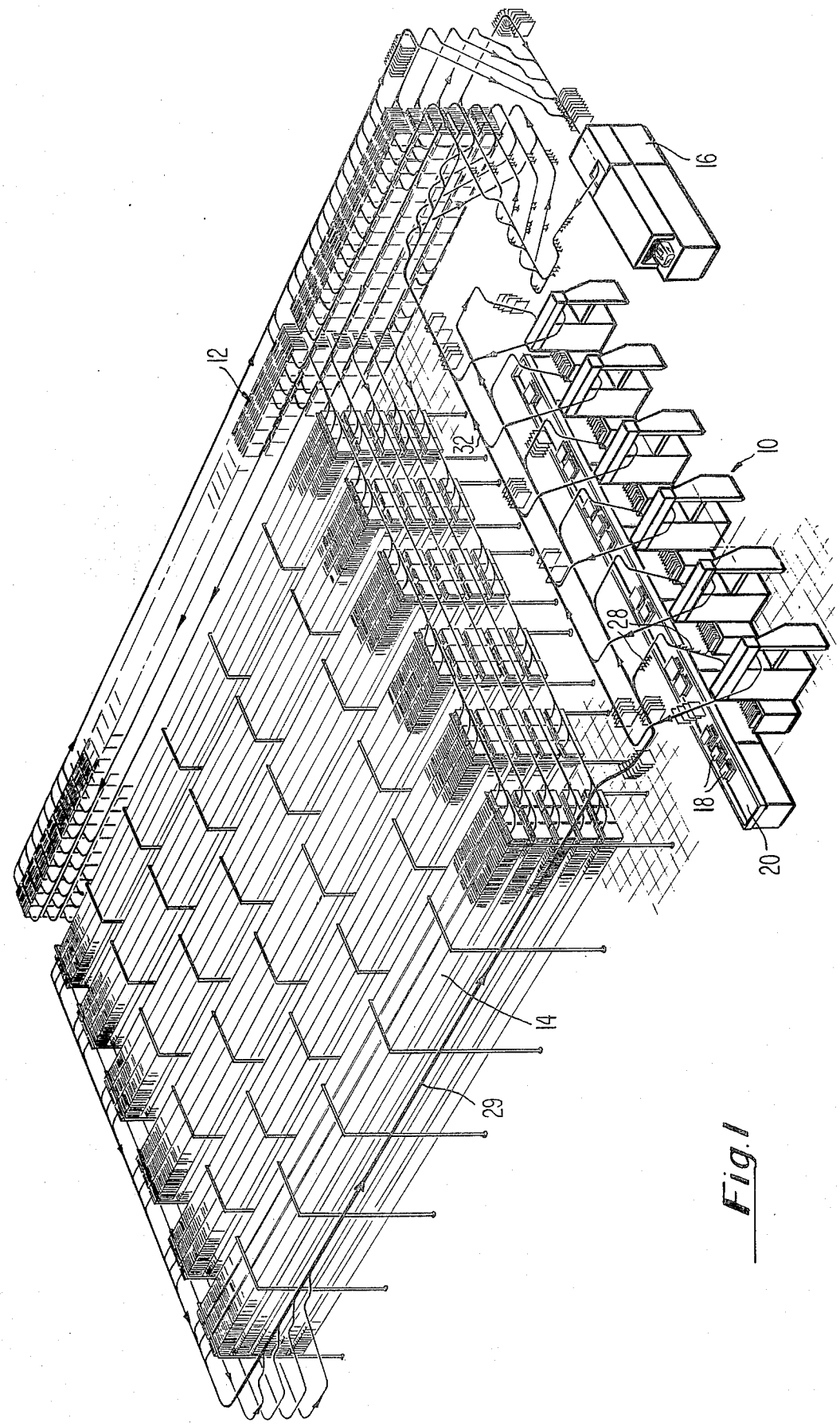
FIG. 1 is a pictorial diagrammatic view of a sorting system employing the present invention.
Figure 2:
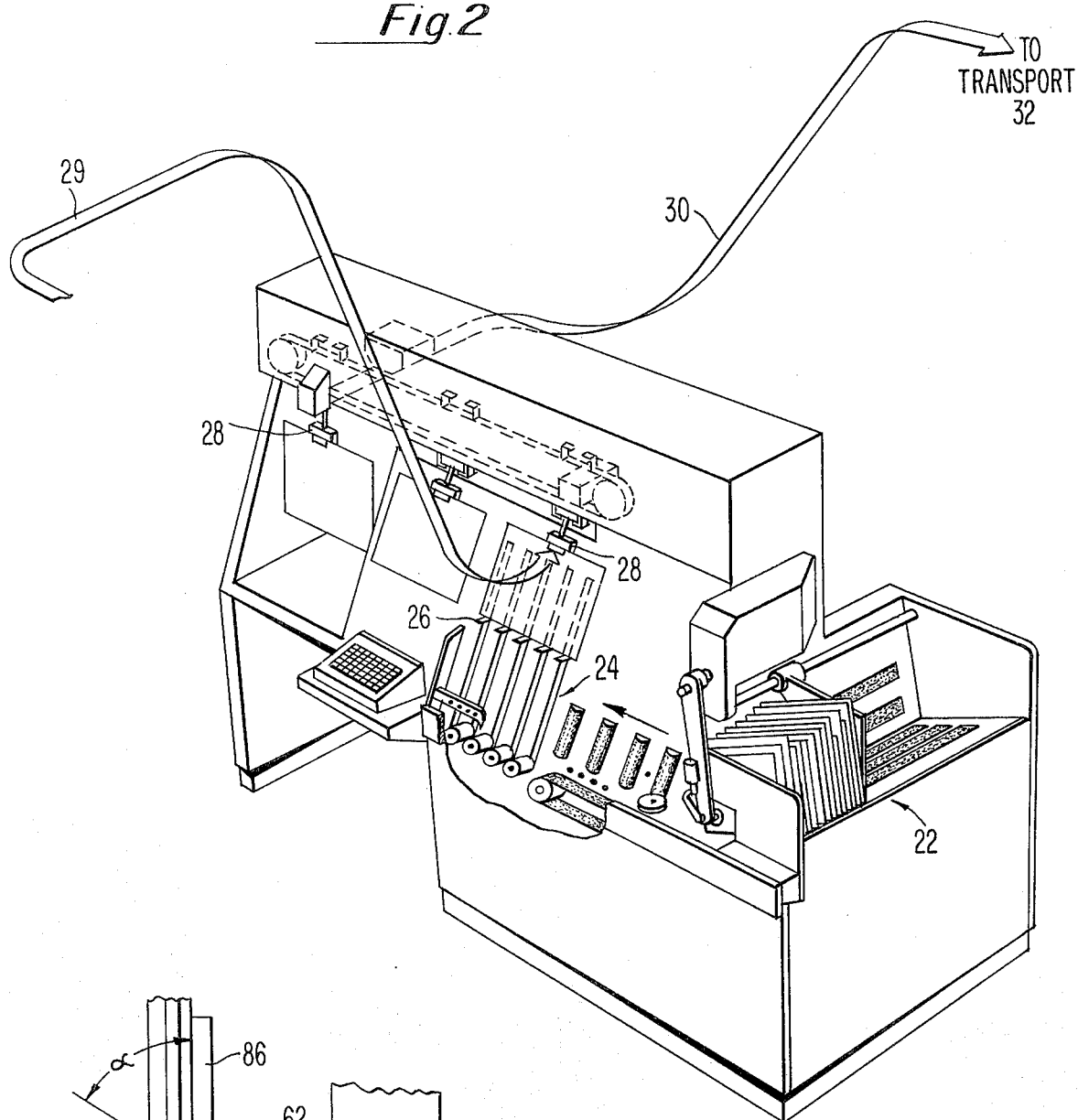
FIG. 2 is a pictorial diagrammatic view of an induction station in a sorting system utilizing the present invention.

As depicted with respect to the handling of flat mail pieces the present system includes, as shown in FIG. 1, induction stations 10, low density output 12, high density output 14, packaging and labeling station 16 and a plurality of transport pathways interconnecting the system as will be described presently with respect to FIG. 1. The various items 18 to be sorted and transported are fed via input conveyor 20 past induction stations 10. The items are removed from the conveyor 20 and placed in the hopper 22 of the induction stations 10 as illustrated in FIG. 2. Items 18 are edge-aligned in vertical array in each hopper 22 to be fed leftwardly in FIG. 2 to an elevator device 24 which moves the items 18 upwardly by means of a plurality of finger mechanisms 26 into the grip of carrier hanger members 28. Empty carriers are received from transport area 29 for transport to the desired prescribed location in accordance with a prearranged program.

Each carrier 28, after attachment thereto of the item 18 and suitable handling at the induction station 10, is automatically fed from the induction station 10 via pathway 30 so as to become interleaved as each group of carriers enter the common transport path 32 of the transport system as described in the earlier mentioned patent application Ser. No. 401,954.

The carrier hanger of the present invention comprises an elongate rigid member 34 of metal or other suitable strong rigid material. The upper end of member 34 terminates in an eye 36 providing means for pivotally mounting a toothed or grooved transport guide 38 thereto. The lands and grooves 40 of member 38 provide means for matingly engaging the lands and grooves 42 of a transport belt 44 for moving the carrier 28 to and from the point of origination and destination, respectively. An upstanding flag-like member 46 having a magnetizable surface (not shown) thereon enables the member 28 to carry a coded legend or magnetic information concerning the handling and movement thereof in accordance with well known magnetic techniques as described in formerly copending U.S. patent application Ser. No. 401,954 previously referred to herein.

The opposite end of member 34 is formed with a right angle bend 48 enabling the device to clear other parts of the transport apparatus with which it may be operably associated during movement thereof. This end of member 34 below the bend 48 is formed with two integral orthogonally arranged substantially U-shaped upper and lower pairs of projections 50 and 52, respectively. Adjacent the lower projections 52 is a depending anvil or backup member 54 also integral with the member 34, for purposes to be explained presently.

Secured in pivotal fashion to the lower extending arms 56 of projections 52 on a short cross shaft 58 are two semi-elliptical, lever pawl or wedging members 60—60 attached to cross shaft 58 by C rings so as to be laterally fixed but free to pivot about shaft 58 as a center. A central spacer-separator 59 separates the members 60—60 for purposes to be explained presently. The members 60—60 are or may be formed of plastic or other suitable rigid light weight material and each one is provided with a peripheral, deformable member 62 of natural or synthetic rubber or other elastic deformable plastic material having suitable resilient properties and coefficient of friction for purposes which will be explained presently. Members 62 are received in peripheral grooves 64, FIG. 4, prior to assembly of the hanger.

Adjacent to the pivotal mounting shaft 58 and slightly off center with respect to the center of each member 60—60 is a mounting aperture 65, FIG. 3, through which a stub cross shaft 66 projects. The members 60—60 have a degree of movement relative to one another about the cross shaft 66 as will become more apparent later on herein. An elongated link 68 is pivotally attached at its lower end to the cross shaft 66 centrally thereof, while the upper end of the link is attached by a C ring, for example, to a stud 70 secured in one of the two parallel arms 72—72 of release member 74, rockably pivoted on cross shaft 76 extending between the upper projecting members 50. A spring 78, secured at its one end to the opposite parallel arm 72 and at its other end to the upper edge portion of the lower projection 52, biases the release member 74, and thus the link 68, downwardly, as seen in the illustrated views of the drawings.

Secured to the backup member or anvil 54 is a resilient deformable member 80. In one embodiment of the present invention, member 80 is configured as an O-ring of rubber or other similar resilient deformable material and is attached at one end to a stake or tab 82 in the upper portion of member 54 and at the opposite end to a depending projecting finger or tab 84 formed in the lower end of anvil 54. So as to prevent member 80 from moving or shifting laterally, it may be additionally adhesively bonded to the anvil throughout its limited extent.

In the embodiment shown in FIGS. 3 and 4, the pawl or wedging members 60—60 are illustrated in an operative position with an item 86 disposed intermediate members 60—60 and the backup member 80 so that item 86 is gripped and held securely therebetween. As previously mentioned, members 60—60 are parallel mounted on cross shaft 58 in such manner as to partake of a slight degree of rotative movement therebetween effective to permit one member 60 to move a few thousandths of an inch with respect to its opposite member 60.

Figure 7:
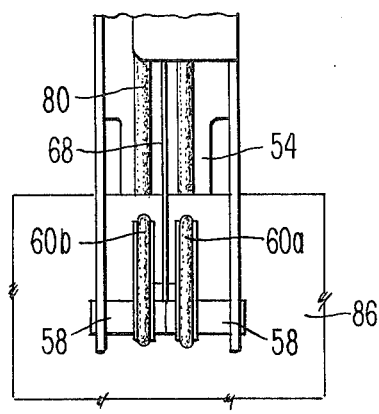
FIGS. 7 through 10 inclusive, are pictorial diagrammatic motion views of the operating portion of the apparatus of FIG. 3 illustrating the closure effect or the swinging-pendulum movement of an item gripped by the hanger carrier mechanism.
Figure 8:
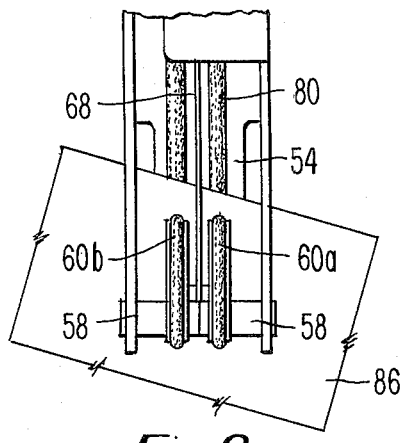
Figure 9:
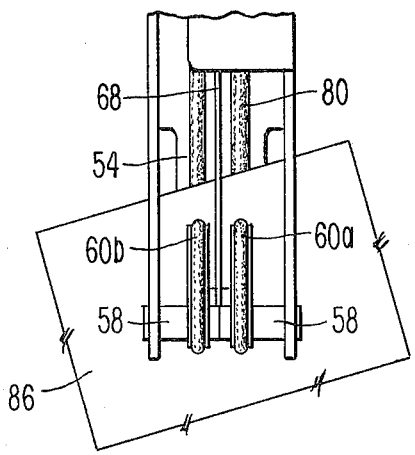
Figure 10:
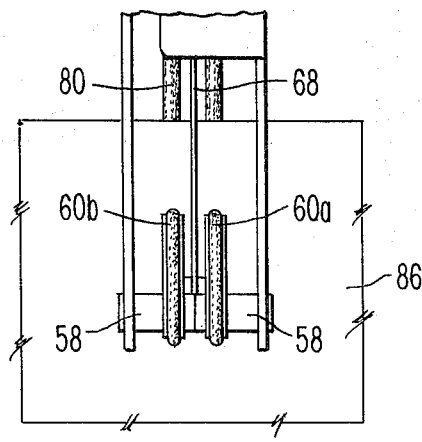

With an item 86 inserted therebetween and assuming the hanger to be in position on the toothed drive belt 44 and moving from a point of origination to a point of destination, any pendulous movement, i.e., tilt or swing of item 86 as seen in FIGS. 7–10 inclusive, will cause the item to rock first one way and then the other, for example, to the right as in FIG. 8. As will become apparent from a consideration of these four views, the item pivots around member 60a while moving with respect to 60b and effectively moves arcuately upwardly around the point of contact between member 60a, the item itself and the anvil material so that the right hand side of the item is pointed downwardly while the left hand side of the item is elevated slightly sliding upwardly with respect to 60b. Continued rocking movement of the item 86 as shown in FIG. 9, will cause the item to pivot around the wedging member 60b with the left portion of the member as the pivot point so that the left side of the item is oriented downwardly while the right side swings arcuately upwardly a slight degree past member 60a. As the item continues to pivot or swing in pendulous fashion, it will in fact, be elevated until it reaches a point above the point at which the pendulous motion began so as to be positioned as shown in FIG. 10 of the drawings.

Consideration of these four figures will make it readily apparent that the item has moved a considerable distance from its starting point as shown in FIG. 7 to the termination point as shown in FIG. 10. Such movement is the result of the structural arrangement of the two wedging members and the fact that the link pivot 66 is sufficiently loose so that each of the wedging members 60a and 60b has a degree of freedom relative to its opposite member. Thus the construction takes advantage of the pivotal, pendulous swinging movement of the item to cause the item to creep slowly upwardly until the item finally bottoms against the lower edges of the bottom two projecting members where it would stay secure until such time as the release member 74 has been triggered by associated mechanism to cause the item to drop into a receiving bin or hopper.

The pawls or wedging members 60—60 are or may be obliged to transport or carry relatively high weights so that it is very desirable for the latter to be self-locking with respect to the items being transported. That is to say, pawl members 60—60, when engaging an item between the backup anvil and the resilient surfaces of the pawl, should press downwardly at an angle sufficiently high to prevent the item from being accidently dislodged but sufficiently low so that the item is securely wedged therebetween but able to swing arcuately about first one than the other pawl so as to move in an upwardly direction to the position shown in FIG. 10.

Figure 11:
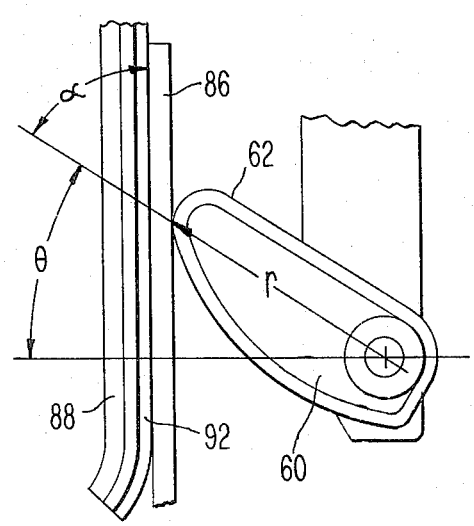
FIG. 11 is a diagrammatic view of the apparatus of the present invention illustrating the constant pressure angle employed therewith.
Figure 5:
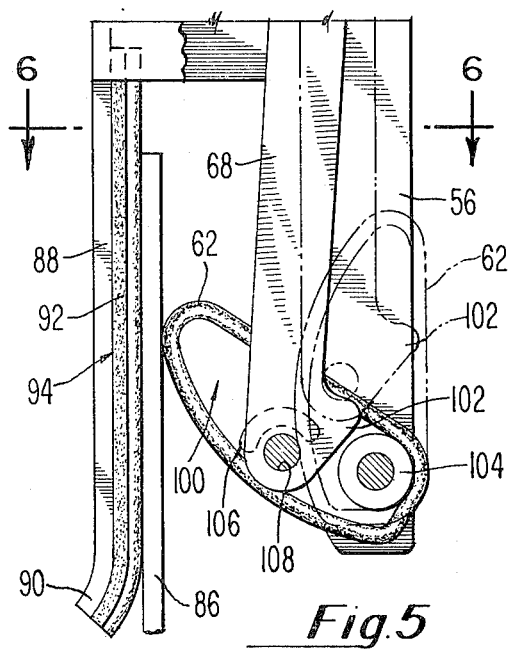
FIG. 5 is an enlarged view illustrating the retracted and operating positions of the carrier hanger of FIG. 3.

For the pawls to be self-locking they must be rotatable and tend to rotate counter-clockwise as viewed in FIGS. 3 and 5 of the drawings. It is also desirable for the pawls to react with the item and the anvil at a constant pressure angle effective to provide uniform pressure against the item independent of the item thickness throughout a prescribed range. Mathmatical analysis demonstrates that a logarithmic spiral produces a curve required to provide a constant pressure angle regardless of the item thickness. Thus, as seen in FIG. 11, the radius $r$ is equal to $e^{a\theta}$. The pressure angle which is the tangent of angle $\alpha$ is equal to $1/a$ producing a constant pressure angle $\alpha$ at the point of contact of the pawls 60—60 with the item 86. Since the item is locked against downward movement it can only move upwardly as it is tilted or rocked about either pawl 60—60 as a pivot point. The action, therefore, effectively forces the item into an ever upwardly directed movement until it is obliged to bottom against the upper portion of the hanger body itself.

In order to simplify the construction of the anvil gripping surfaces, the anvil or backup member 54 (FIGS. 5 and 6) is formed as a flat elongated extension 88 with the lower extending portion thereof slightly curved as at 90 so as to avoid any interference with the upward movement of the item 86. The surface of member 88 is provided, as seen in the sectional view of FIG. 6, with a resilient member 92 having an irregular repeating pattern 94 thereon. Pattern 94 in this instance includes two parallel lands 96 separated by groove 98. Lands 96 are arranged so as to confront and contact the resilient members 62—62 of the wedging members 100—100. As seen most clearly in FIG. 6, with the item 86 interposed between the member 62—62 and the members 96—96, the latter grip the item securely.

In order to avoid the possible over-travel of the wedging members 100—100 as they are positioned tightly against the backup anvil with the item therebetween, (which would in effect tend to force the item downwardly out of engagement with the wedging members 100—100) a stop member 102 is formed on the lower end of control link 68. The protuberence 102 is adapted to abut the shank of the wedging members 100—100 when the latter members are in the item engaging position (full line in FIG. 5).

Figure 6:
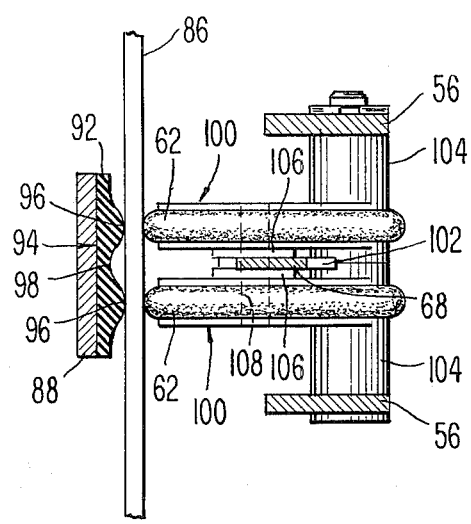
FIG. 6 is a view along the line 6—6 of FIG. 5.

An additional modification of the invention has to do with the wedging members themselves as seen in FIGS. 5 and 6. Each member 100—100 includes an integral shank portion 104 and an arcuate spacing projection 106 adjacent the link mounting aperture 108. The wedging member can be integrally molded resulting in a left and right handed unit two of which, joined back to back, produce the arrangement of FIG. 6.

In operation of the invention, as the items 86, carried by respective hangers 28, are fed into the output section of the flat mail handling system, the angled edge 74' of release member 74 is engaged by means (not shown) e.g., cam means, forcing the release member rightwardly (FIG. 4) against the tension of spring 78. This action retracts the pawls 60—60, 100—100, as the case may be, away from the item permitting the items to drop onto a suitable conveyor or into a prearranged container.

There has thus been described a new, novel and heretofore unknown apparatus for transporting flat, relatively thin objects of generally rectangular cross section from one place to another which takes advantage of a pressure gripping arrangement wherein any tendency on the part of the object to swing or tilt translates itself into a tighter gripping effect forstalling any tendency for the object to be dropped or lost in transit.

What is claimed is:

1. A carrier mechanism for transporting objects such as mail items from place to place for disposition at an intermediate or ultimate distination comprising, an irregularly shaped member having transport engaging means at one end thereof and object engaging means at the opposite end thereof, said object engaging means including oppositely disposed orthogonally arranged pivot support means and a backup anvil adjacent one of said support means, a plurality of item gripping (means) levers having a resilient surface portion disposed on (one of) said support means movable into and out of engagement with an item disposed between said item gripping means and said backup anvil, each of said item gripping means being capable of independent relative motion with respect to the other of said gripping means, and release means on the other of said support means including means engagable with the transport apparatus for resiliently causing said gripping means to engage an item for transport thereby and subsequently to release said item at the intermediate or ultimate destination thereof, said item gripping means being capable of relative movement with respect to said item whereby any pendulum tilt or rocking movement of said item causes one of said gripping means to hold said item while the item moves with respect to the other of said gripping means so that the (latter) item (to further engage) moves into tighter engagement with said gripping means.

2. The invention in accordance with claim 1 wherein said anvil and said gripping means include resilient means operably interengagable upon relative motion of said release means with respect to said anvil.

3. The invention in accordance with claim 1 wherein said item gripping means comprises individual elliptically shaped members provided with resilient peripheral portions for operable engagement with the resilient means on said anvil.

4. The invention in accordance with claim 1 wherein said release means further includes an elongated rockable member having stop means engagable with said gripping means effective to limit the pivotal movement of said gripping means toward said anvil.

5. The invention in accordance with claim 1 wherein the resilient means of said anvil comprises a relatively flat flexible member having an irregular surface portion exposed for intimate contact with said gripping means when said gripping means is brought into engagement therewith.

6. The invention in accordance with claim 5 wherein said flexible member of said anvil is constructed to provide oppositely disposed parallel raised land portions for contact with the resilient portions of said gripping means when the latter engages said anvil.

7. The invention in accordance with claim 1 wherein said gripping means includes a pair of non-metallic elliptical members, the peripheral portion of each of which is channeled, undercut and grooved so as to receive a continuous element of resilient material therein.

* * * * *